(12) United States Patent
Lai et al.

(10) Patent No.: US 10,113,925 B2
(45) Date of Patent: Oct. 30, 2018

(54) MULTISTAGE SENSING DEVICE

(71) Applicant: National Tsing Hua University, Hsinchu (TW)

(72) Inventors: Wei-Cheng Lai, Taipei (TW); Wei-Leun Fang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 15/130,214

(22) Filed: Apr. 15, 2016

(65) Prior Publication Data

US 2017/0108389 A1 Apr. 20, 2017

(30) Foreign Application Priority Data

Oct. 19, 2015 (TW) .............................. 104134228 A

(51) Int. Cl.
*G01L 5/16* (2006.01)
*G01L 1/04* (2006.01)
*G01L 1/18* (2006.01)
*G01L 1/14* (2006.01)

(52) U.S. Cl.
CPC ................ *G01L 5/162* (2013.01); *G01L 1/04* (2013.01); *G01L 1/14* (2013.01); *G01L 1/18* (2013.01)

(58) Field of Classification Search
CPC .............. G01L 5/162; G01L 1/04; G01L 1/18
USPC ...................... 73/862.041–862.046
See application file for complete search history.

(56) References Cited

U.S. PATENT DOCUMENTS

| | | | | |
|---|---|---|---|---|
| 5,437,196 A * | 8/1995 | Okada | ..................... | G01L 5/165 73/514.18 |
| 5,801,313 A * | 9/1998 | Horibata | ............... | G01L 9/0073 361/283.4 |
| 6,159,761 A * | 12/2000 | Okada | ................. | G01P 15/0802 438/462 |
| 6,378,381 B1 * | 4/2002 | Okada | ..................... | G01D 5/24 73/514.32 |
| 8,342,021 B2 * | 1/2013 | Oshio | .................... | G01C 19/56 73/493 |
| 8,710,383 B2 * | 4/2014 | Chen | ...................... | H01H 3/125 200/5 A |
| 8,904,885 B2 * | 12/2014 | Ikebe | ..................... | B25J 13/083 73/780 |

(Continued)

FOREIGN PATENT DOCUMENTS

| TW | 392353 B | 6/2000 |
|---|---|---|
| TW | 201145770 A1 | 12/2011 |
| TW | M435708 U1 | 8/2012 |

*Primary Examiner* — Jonathan Dunlap
*Assistant Examiner* — Octavia Hollington
(74) *Attorney, Agent, or Firm* — Birch, Stewart, Kolasch & Birch, LLP

(57) ABSTRACT

A multistage sensing device includes a substrate, a deformable unit, and a sensor unit. The deformable unit has a first body disposed on the substrate, and a second body disposed on the first body and opposite to the substrate. The sensor unit includes a first sensor element and a second sensor element that are disposed in the deformable unit. The first sensor element is disposed between the second sensor element and the substrate. The second sensor element is operable to measure deformation of the second body when an external force is applied to the deformable unit. The first sensor element is operable to measure deformation of the first body when the first body is deformed by the deformation of the second body.

20 Claims, 7 Drawing Sheets

(56) References Cited

U.S. PATENT DOCUMENTS

| | | | |
|---|---|---|---|
| 9,201,468 B2 * | 12/2015 | Schediwy | G06F 1/1692 |
| 9,310,265 B2 * | 4/2016 | Shimoyama | G01L 1/04 |
| 9,493,339 B2 * | 11/2016 | Ikehashi | B81B 3/0021 |
| 2010/0270089 A1 | 10/2010 | Kyung et al. | |
| 2011/0120550 A1 * | 5/2011 | Okada | H01G 9/2095 |
| | | | 136/256 |
| 2011/0291208 A1 * | 12/2011 | Takagi | B81B 7/02 |
| | | | 257/417 |
| 2012/0293491 A1 * | 11/2012 | Wang | G06F 3/0338 |
| | | | 345/419 |
| 2013/0307789 A1 | 11/2013 | Karamath et al. | |
| 2015/0002447 A1 | 1/2015 | Schediwy | |

* cited by examiner

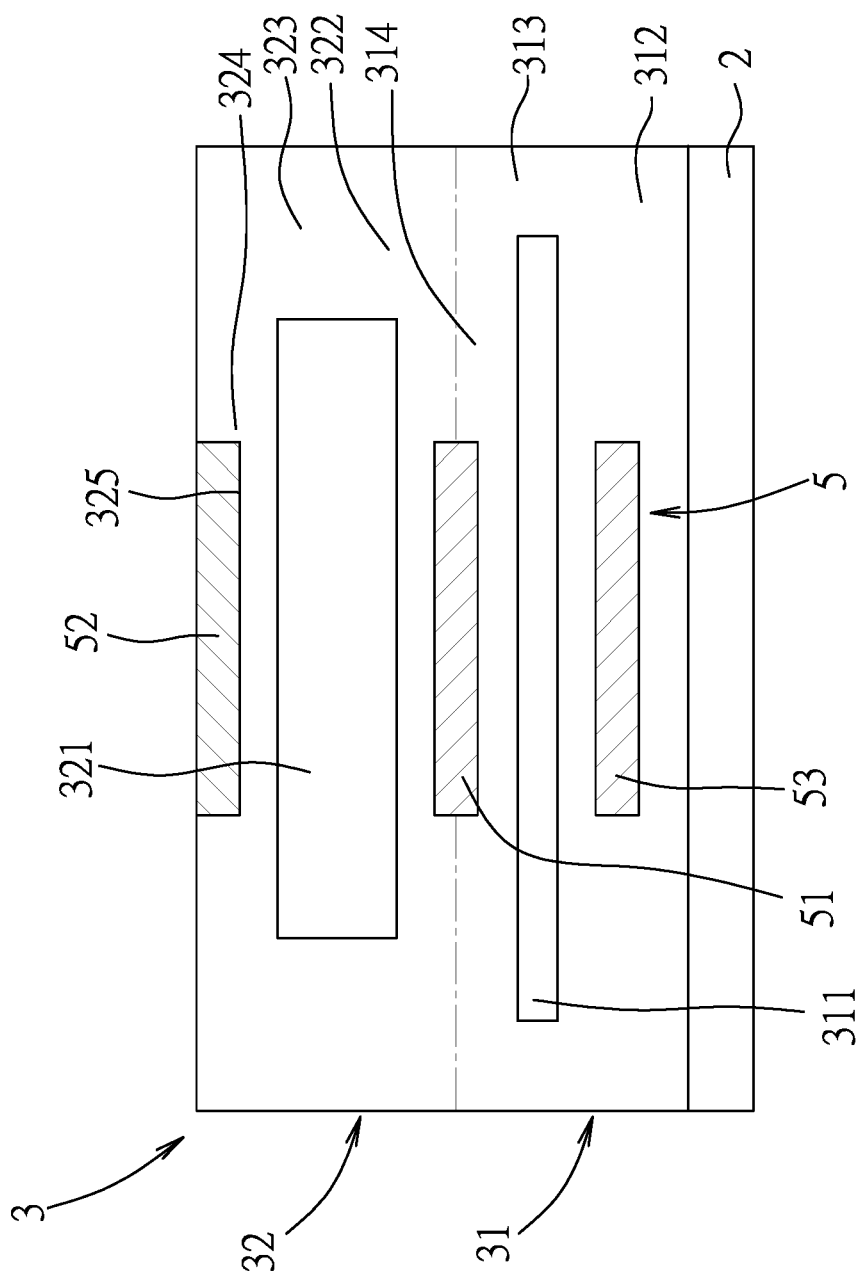
F I G. 1

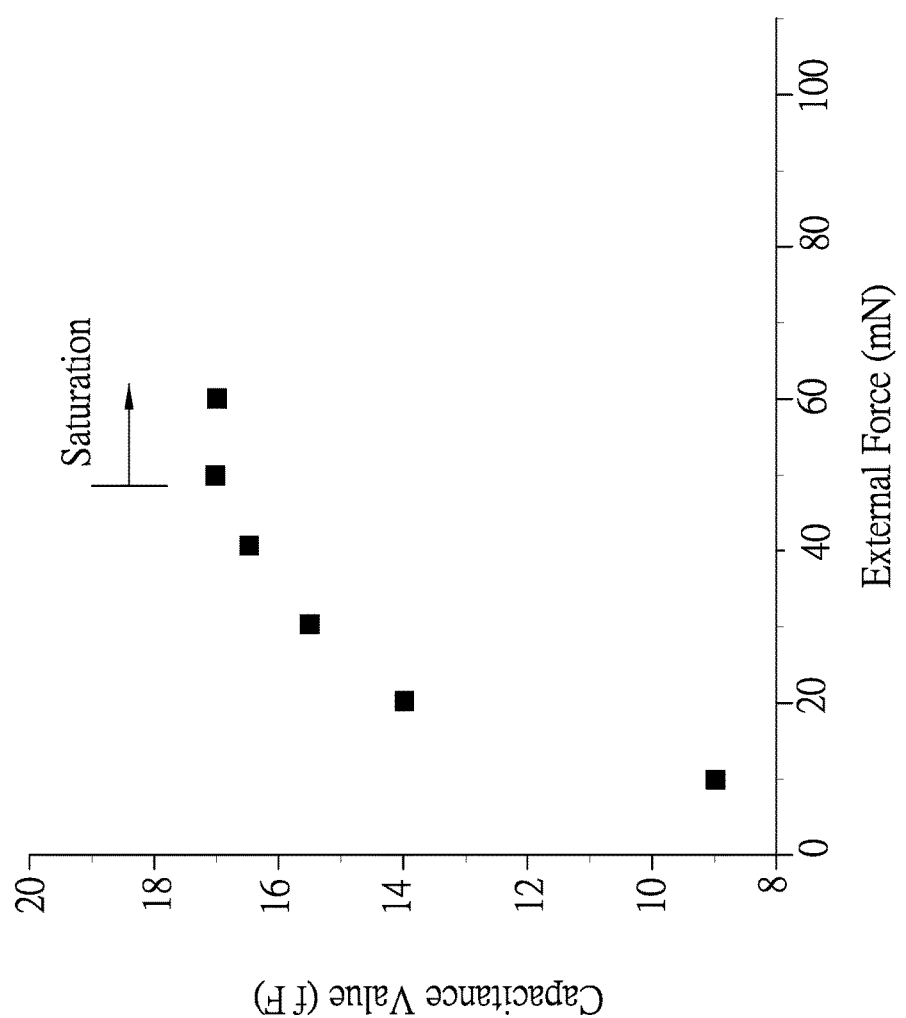
F I G. 6

MULTISTAGE SENSING DEVICE

CROSS-REFERENCE TO RELATED APPLICATION

This application claims priority of Taiwanese Patent Application No. 104134228, filed on Oct. 19, 2015.

FIELD

The disclosure relates to a sensing device, more particularly to a multistage sensing device.

BACKGROUND

A conventional sensing device is able to convert physical quantities generated by an external force into measurable signals, so that it is possible to identify the interaction between the sensing device and external force. These sensing devices, such as touch sensors, are widely used in fields including robotics, gaming entertainment, biomedical technology, etc. Measurable signals of the touch sensors can typically be classified as piezoresistance, piezoelectricity, capacitance, optical signals, etc.

In conventional touch sensors, aside from adjusting the structure thereof, a dielectric polymer such as polydimethylsiloxane (PDMS), or other rigid material, is often disposed in the touch sensors to adjust the stiffness of the touch sensors and change the overall sensing range of the touch sensors. However, the fixed properties of the materials cause the touch sensors to have a fixed sensing range. Sensing ranges of these touch sensors can vary by adjusting the degree of crosslinking of PDMS. The adjustment may be achieved by changing the proportion of curing agents that are used in formation of PDMS. In other words, when wishing to change the sensing range of currently available touch sensors, the material must be replaced, leading to reduced flexibility and limited sensing range associated with the existing touch sensors.

SUMMARY

Therefore, an object of the present disclosure is to provide a multistage sensing device that can alleviate the drawback associated with the prior art.

According to the present disclosure, a multistage sensing device includes a substrate, a deformable unit, and a sensor unit. The deformable unit has a first body disposed on the substrate, and a second body disposed on the first body opposite to the substrate. The sensor unit includes a first sensor element and a second sensor element that are disposed in the deformable unit. The first sensor element is disposed between the second sensor element and the substrate. The second sensor element is operable to measure deformation of the second body when an external force is applied to the deformable unit. The first sensor element is operable to measure deformation of the first body when the first body is deformed by the deformation of the second body.

BRIEF DESCRIPTION OF THE DRAWINGS

Other features and advantages of the present disclosure will become apparent in the following detailed description of the embodiments with reference to the accompanying drawings, of which:

FIG. 1 is a schematic side view of a first embodiment of a multistage sensing device according to the present disclosure;

FIG. 6 is a diagram showing capacitance values of the second embodiment measured between a first electrode and a second electrode, versus values of an external force applied to the second embodiment.

DETAILED DESCRIPTION

Figure 2:
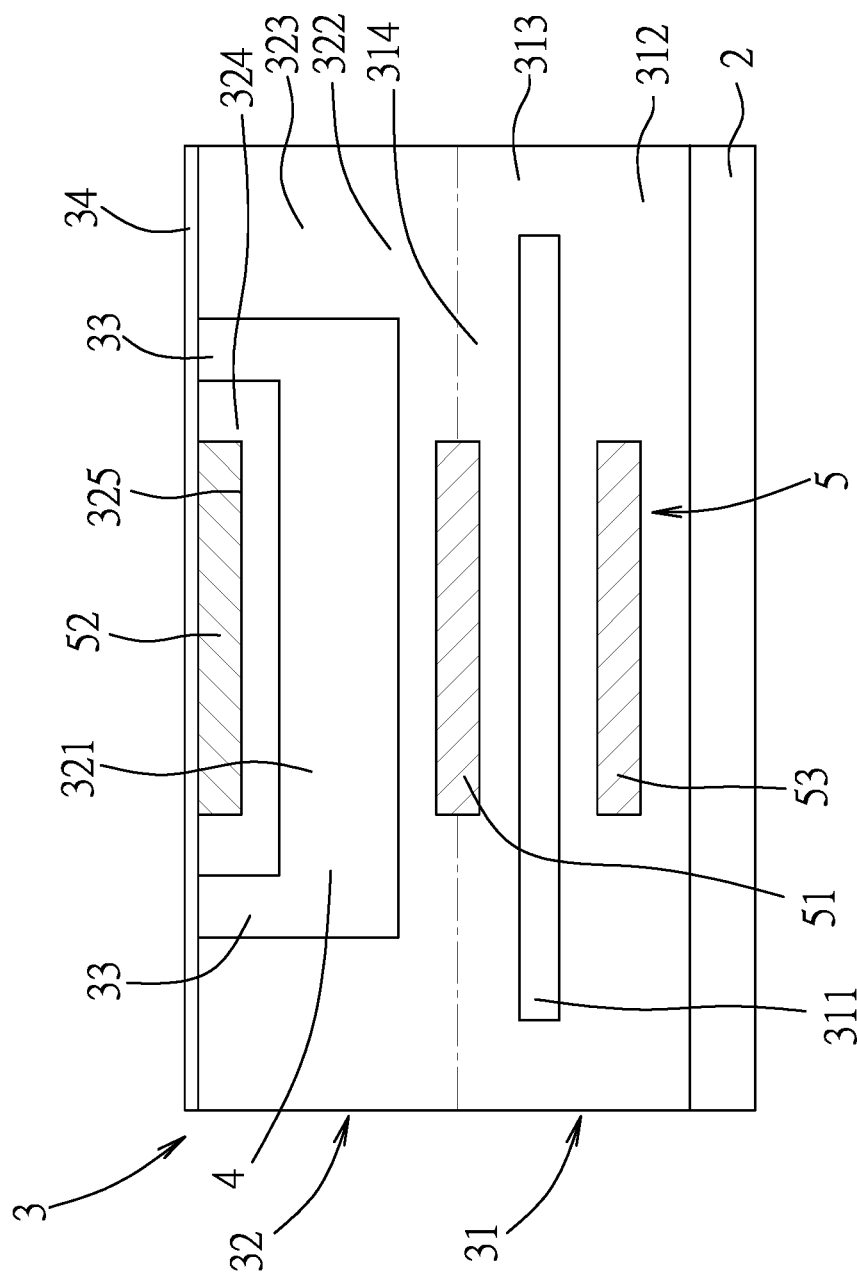
FIG. 2 is a schematic side view of a second embodiment of the multistage sensing device according to the present disclosure.

Before the disclosure is described in greater detail, it should be noted that like elements are denoted by the same reference numerals throughout the disclosure.

Referring to FIG. 1, a first embodiment of a multistage sensing device according to the present disclosure includes a substrate 2, a deformable unit 3, and a sensor unit 5.

The deformable unit 3 is resiliently deformable by an external force, and has a first body 31 disposed on the substrate 2 and a second body 32 disposed on the first body 31 and opposite to the substrate 2. The first body 31 is formed with a first space 311. The second body 32 is formed with a second space 321. To be more specific, the first body 31 has a first bottom portion 312 formed on the substrate 2, a first side portion 313 extending from a periphery of the first bottom portion 312 away from the substrate 2, and a first top portion 314 connected to the first bottom portion 312. The first bottom portion 312, the first side portion 313, and the first top portion 314 of the first body cooperatively define the first space 311. The second body 32 has a second bottom portion 322 formed on the first top portion 314, a second side portion 323 extending from a periphery of the second bottom portion 322 away from the substrate 2, and a second top portion 324 connected to the second bottom portion 322. The second bottom portion 322, the second side portion 323 and the second top portion 324 cooperatively define the second space 321.

The sensor unit 5 includes a first sensor element and a second sensor element that are disposed in the deformable unit 3. The first sensor element is disposed between the second sensor element and the substrate 2. The second sensor element is operable to measure deformation of the second body 32 when the external force is applied to the deformable unit 3. The first sensor element is operable to measure deformation of the first body 31 when the first body 31 is deformed by the deformation of the second body 32. In this embodiment, the sensor unit 5 includes a first electrode 51, a second electrode 52, and a third electrode 53 that are disposed in the deformable unit 3. The second electrode 52 and an upper portion of the first electrode 51 cooperatively define the second sensor element. The third electrode 53 and a lower portion of the first electrode 51 cooperatively define the first sensor element. Specifically, the first electrode 51 is disposed between the first top portion 314 of the first body 31 and the second bottom portion 322 of the second body 32. The second electrode 52 is disposed in the second top portion 324 of the second body 32. The third electrode 53 is disposed in the first bottom portion 312 of the first body 31. In certain embodiments, the second top portion 324 of the second body 32 is formed with a recess 325 in which the second electrode 52 is disposed.

It should be particularly pointed out that the locations of the first, second and third electrodes 51, 52, 53 should not be limited to what are disclosed above, and may be changed according to practical requirements, as long as the first and second electrodes 51, 52 are disposed opposite to each other with respect to the second space 321, and the first and third electrodes 51, 53 are disposed opposite to each other with respect to the first space 311 for respective measurement of the deformation of the second body 32 and the deformation of the first body 31.

The substrate 2 may be made of silicon. The first body 31 and the second body 32 of the deformable unit 3 are each made of a dielectric material, such as silicon dioxide ($SiO_2$), silicon nitride ($Si_3N_4$), polydimethylsiloxane (PDMS), etc. Alternatively, the first, second and third electrodes 51, 52, 53 may each be made of metal. In certain embodiments, the substrate 2 is made of silicon, and the deformable unit 3 is made of silicon dioxide.

Referring to FIG. 2, a second embodiment of the multistage sensing device of the present disclosure is similar to the first embodiment, with differences described below. In this embodiment, the multistage sensing device further includes a filling member 4 that is received in at least one of the first space 311 or the second space 321. In certain embodiments, the deformable unit 3 further has at least one through hole 33. In FIG. 2, the filling member 4 is received in the second space 321. The deformable unit 3 has two through holes 33 that penetrate through the second top portion 324 of the second body 32, and that are in spatial communication with the second space 321, so that the filling member 4 is capable of entering the second space 321 through the through holes 33. The through holes 33 are respectively disposed at two opposite sides of the recess 325. The deformable unit 3 includes a covering layer 34 that is disposed on the second top portion 324 of the second body 32, and that covers the through holes 33 and the recess 325.

Specifically, the filling member 4 enters the second space 321 through the through holes 33, after which the through holes 33 are sealed with the covering layer 34, so that the filling member 4 is sealed in the second space 321. The number and the location of the through holes 33 are not limited to what is disclosed herein, as long as the filling member 4 is capable of being disposed in the first space 311 or the second space 321 through the through holes 33. In certain embodiments, the second top portion 324 of the second body 33 may be omitted, and the covering layer 34 seals the second space 321 after the filling member 4 is disposed in the second space 321. The second electrode 52 is disposed on the covering layer 34 opposite to the filling member 4.

The filling member 4 has a stiffness that is tunable by an external electric field or an external magnetic field. In certain embodiments, the filling member 4 is a smart fluid, e.g., an electrorheological fluid (ER-fluid) or a magnetorheological fluid (MR-fluid), and includes an insulating fluid (not shown) and a plurality of particles (not shown) dispersed in the insulating fluid. The insulating fluid may be silicone oil or mineral oil. When the filling member 4 is the ER-fluid, the particles may be dielectric particles (e.g., silicon dioxide particles) that are capable of being polarized by the external electric field, and aligning along the external electric field for increasing the stiffness of the filling member 4. When the filling member 4 is the MR-fluid, the particles may be magnetic particles (e.g., iron powders) that are capable of being polarized by the external magnetic field, and aligning along the external magnetic field for increasing the stiffness of the filling member 4.

In certain embodiments, the filling member 4 may be made of polydimethylsiloxane (PDMS) and is received in at least one of the first space 311 or the second space 321 for changing stiffness of at least one of the first body 31 or the second body 32, and the covering layer 34 may be omitted.

The covering layer 34 is made of a material selected from the group consisting of Parylene C, Parylene D, Parylene N, silicon dioxide, silicon nitride, polyimide, metal, and combinations thereof.

In certain embodiments, the substrate 2 is made of silicon, the deformable unit 3 is made of silicon dioxide, the filling member 4 is the ER-fluid, and the covering layer 34 is made of parylene C. The multistage sensing device may be made by microelectromechanical systems (MEMS) techniques, in which the deformable unit 3 and the sensor unit 5 are formed by techniques of etching, hole formation, etc., followed by disposing the filling member 4 into second space 321, and subsequently forming the covering layer 34 on the deformable unit 3. The manufacturing techniques of sensing devices are well known in the art, and detailed descriptions thereof are not further described for the sake of brevity.

Figure 3:
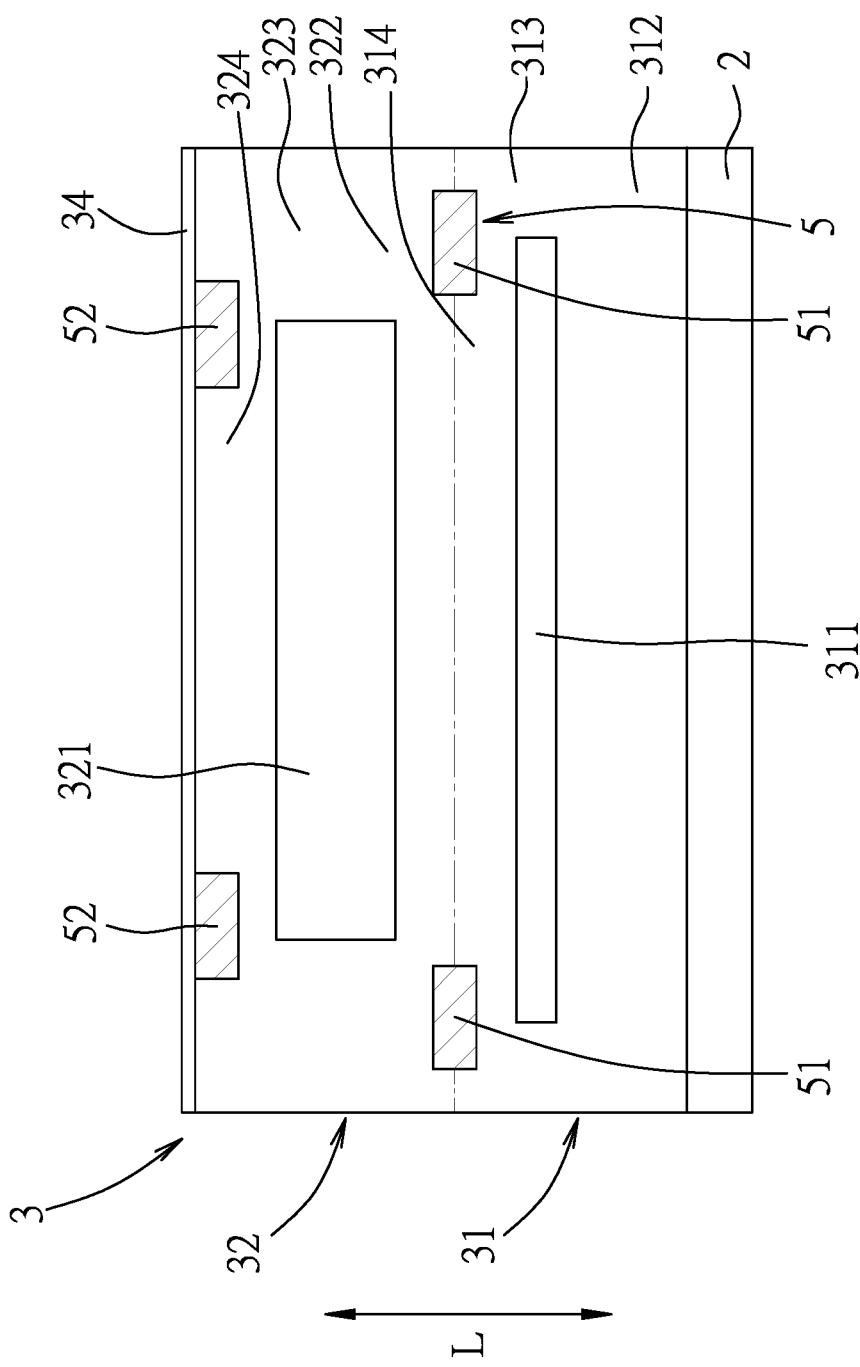
FIG. 3 is a schematic side view of a third embodiment of the multistage sensing device according to the present disclosure.

Referring to FIG. 3, a third embodiment of the multistage sensing device of the present disclosure is similar to the first embodiment, with differences described below. In this embodiment, the first sensor element includes two first piezoresistive members 51 and the second sensor element includes two second piezoresistive members 52. The first piezoresistive members 51 are located between the first top portion 314 of the first body 31 and the second bottom portion 322 of the second body 32, and are oppositely disposed at the same height from the substrate 2. The second piezoresistive members 52 are located in the second top portion 324 of the second body 32, and are oppositely disposed at the same height from the substrate 2. In certain embodiments, the second piezoresistive members 52 partially overlap the second space 321 in a vertical direction (L) that extends from the substrate 2 toward the deformable unit 3.

The first piezoresistive members 51 are deformable with respect to the deformation of the first body 31, and the second piezoresistive members 52 are deformable with respect to the deformation of the second body 32. Therefore, by measuring the changes in resistance values of the first piezoresistive members 51 and the second piezoresistive members 52, the deformation values of the first body 31 and the second body 32 can be obtained, and the external force applied to the deformable unit 3 can be subsequently calculated.

In certain embodiments, the first piezoresistive members 51 may be replaced by two first metal electrodes, and the second piezoresistive members 52 may be replaced by two second metal electrodes. Deformation of the first body 31 can be measured by a capacitance change between the two first metal electrodes, and deformation of the second body 32 can be measured by a capacitance change between the two second metal electrodes. Since the techniques for measuring the capacitance change and the amount of deformation are well known in the art, the same are not further described for the sake of brevity.

The multistage sensing device may be used in robotics, portable apparatuses, touch screens, biomedical technologies, etc.

Figure 4:
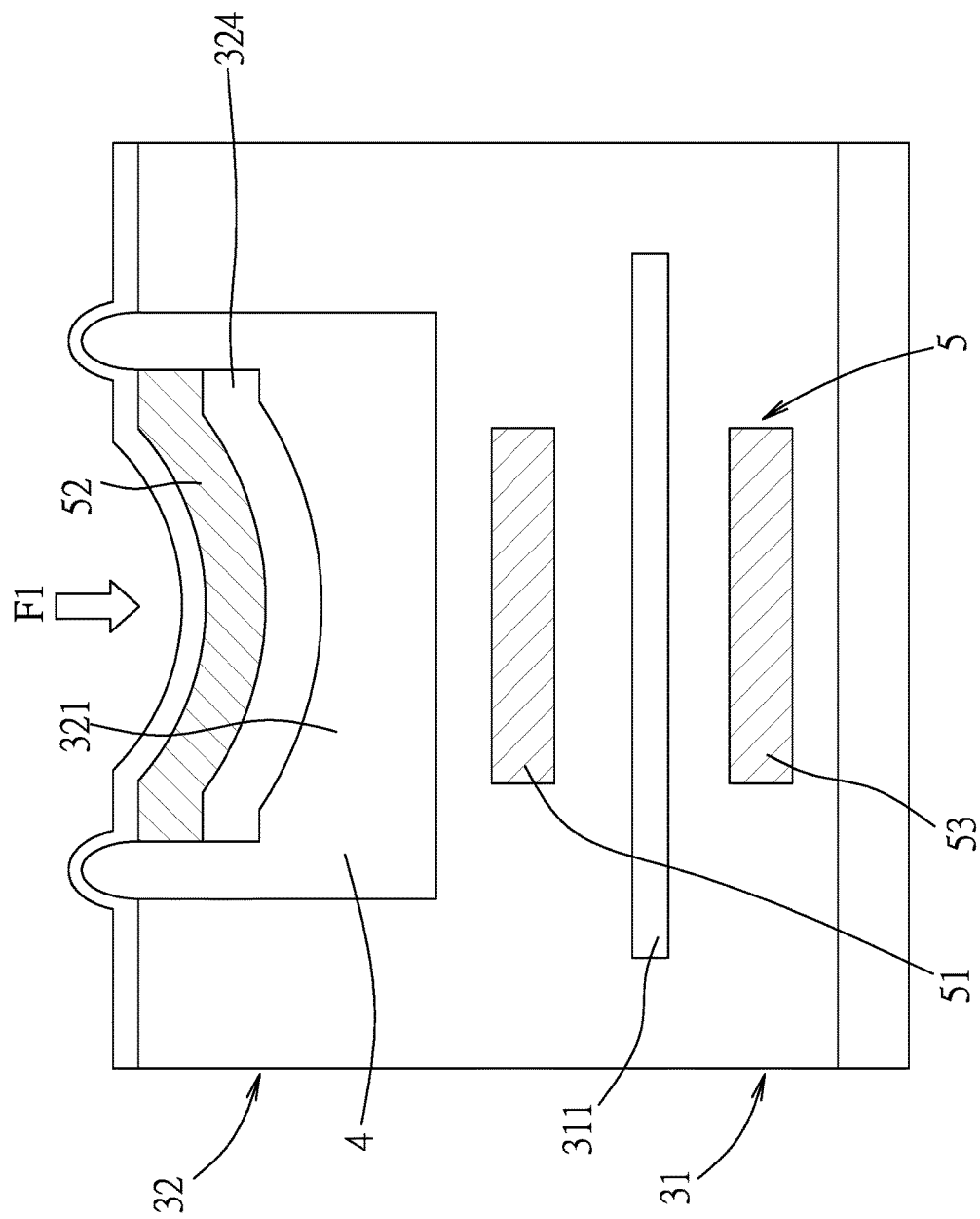
FIG. 4 is a schematic side view showing a first external force applied to the second embodiment.

Referring to FIG. 4, when the multistage sensing device according to the second embodiment is in use, a first external force (F1) is applied to the second top portion 324 of the second body 32 of the deformable unit 3, causing the second top portion 324 and the second electrode 52 to be deformed so as to deform the filling member 4. A signal change between the first and second electrodes 51, 52 is measured.

To be specific, an assembly of the first and second electrodes 51, 52 and the filling member 4 is a capacitor, and the multistage sensing device is used as a capacitive touch sensor. When the second electrode 52 and the filling member 4 are deformed, a distance between the first and second electrodes 51, 52 is changed, and therefore a capacitance change (i.e., the signal change) can be measured between the first and second electrodes 51, 52. It should be noted that the type of signal associated with the external force applied to the multistage sensing device may be a signal other than capacitance, such as resistance (i.e., when the piezoresistive members are used), optical property, etc. The type of signal is well known in the art and therefore is not further described for the sake of brevity.

It is known that capacitance is inversely proportional to the distance between the first and second electrodes 51, 52. When a larger amount of the external force is applied, deformation of the filling member 4 is increased, which moves the second electrode 52 and the first electrode 51 closer together, resulting in a larger capacitance between the first and second electrodes 51, 52. When the external force exceeds the deformation limit of the filling member 4, the filling member 4 is no longer capable of being deformed, and thus a maximum capacitance value (i.e., saturation capacitance) is measured between the first and second electrodes 51, 52. In such case, capacitance greater than the saturation capacitance cannot be measured. Although the stiffness of the filling member 4 may be increased by the application of the external electric field or the external magnetic field, the external force still cannot be measured when the filling member 4 reaches its maximum deformation.

Figure 5:
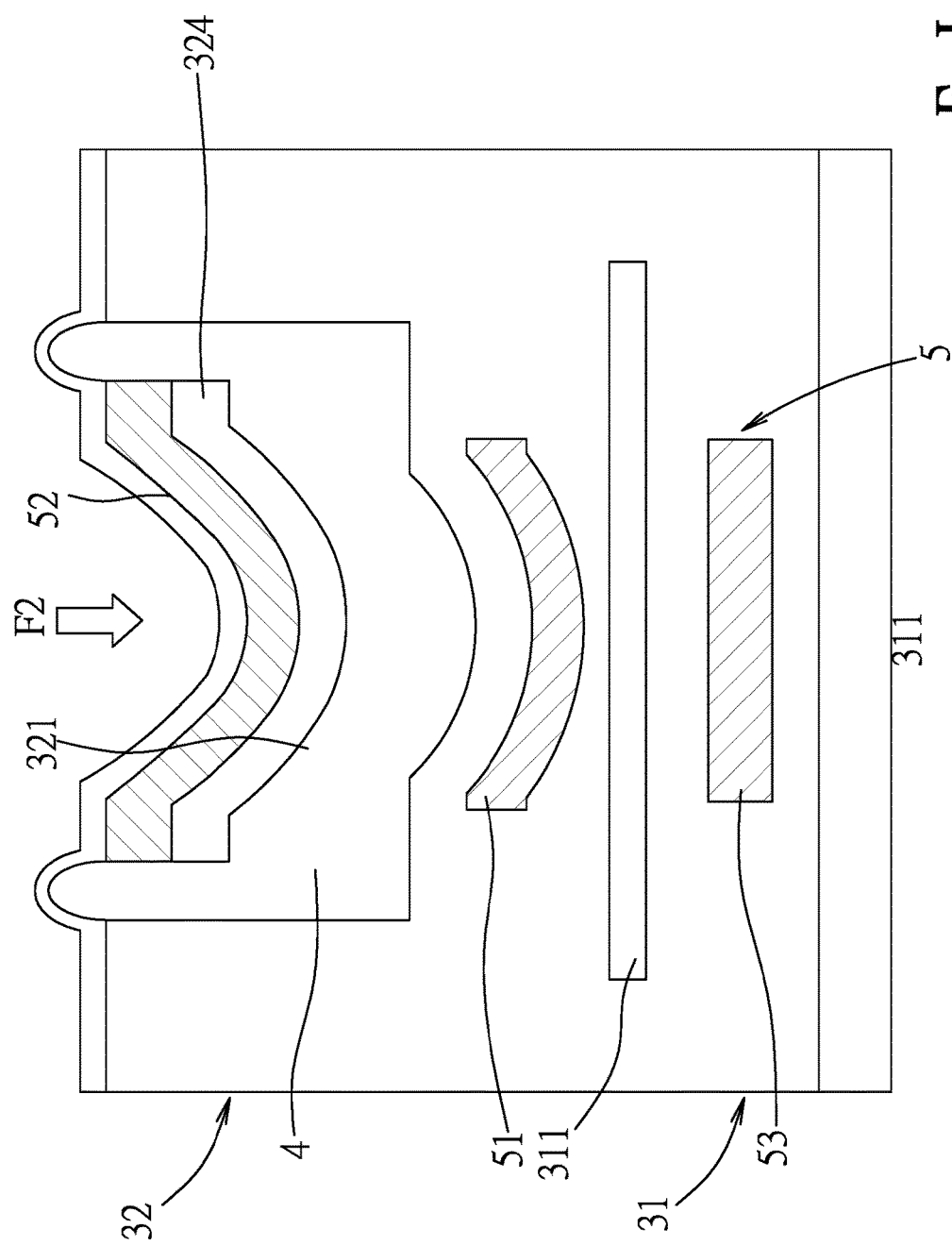
FIG. 5 is a schematic side view showing a second external force that is greater than the first external force and that is applied to the second embodiment.

FIG. 5 shows that a second external force (F2) larger than the first external force (F1) is applied to the multistage sensing device of this embodiment according to this disclosure. In this embodiment, since the second body 32 and the filling member 4 are no longer capable of being deformed, the first body 31 is thus deformed by the deformation of the second body 32. In such case, the multistage sensing device of this embodiment is capable of measuring the second external force (F2) by virtue of the capacitance change caused by the distance change between the first and third electrodes 51, 53.

Figure 7:
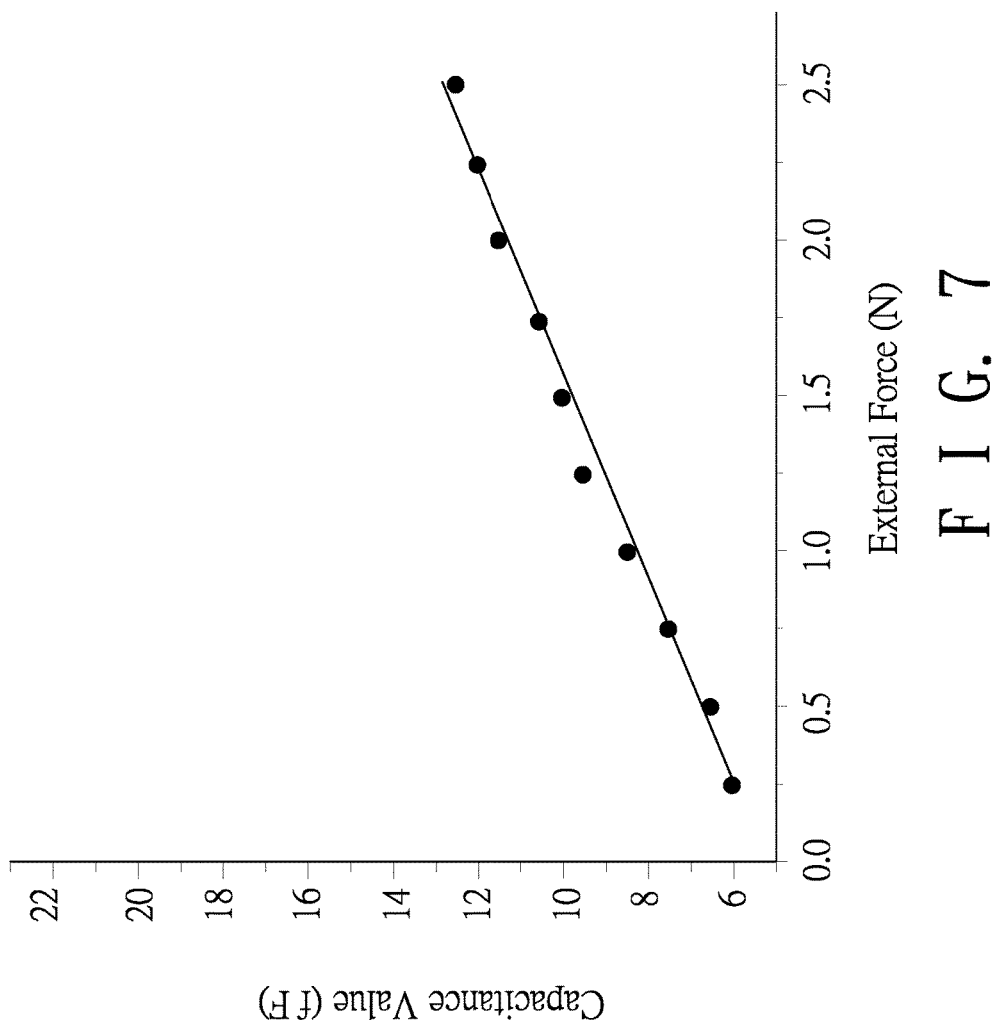
FIG. 7 is a diagram showing capacitance values of the second embodiment measured between the first electrode and a third electrode, versus values of the external force applied to the second embodiment.

FIG. 6 is a diagram showing the external force applied to the multistage sensing device shown in FIG. 5 versus capacitance values measured between the first and second electrodes 51, 52. FIG. 7 is a diagram showing the external force applied to the multistage sensing device shown in FIG. 5 versus capacitance values measured between the first and third electrodes 51, 53. As shown in FIG. 6, when the external force reaches 50 mN or more, a maximum capacitance is obtained (i.e., saturation capacitance is reached). However, as shown in FIG. 7, the capacitance value between the first and third electrodes at an external force of 2.5 N still does not reach the maximum capacitance value. Therefore, it is possible with the configuration of the multistage sensing device of this embodiment to measure a larger range of the external force, from the scale of milli-newtons (mN) to newtons (N).

It should be particularly pointed out that the sensor unit 5 may include more than two of the sensor elements, and the multiple sensor elements are separately disposed in the deformable unit in the vertical direction (L). Therefore, a wider range of sensing capability can be achieved.

To sum up, with the first and second sensor elements disposed in the deformable unit 3, the deformations of the first and second bodies 31, 32 can be respectively measured by the first and second sensor elements, thereby achieving multistage sensing capability without the need to replace the deformable unit 3.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A multistage sensing device comprising:
   a substrate;
   a deformable unit having a first body disposed on said substrate, and a second body disposed on said first body and opposite to said substrate; and
   a sensor unit including a first sensor element and a second sensor element that are disposed in said deformable unit, said first sensor element being disposed between said second sensor element and said substrate,
   wherein said second sensor element is operable to measure deformation of said second body when an external force is applied to said deformable unit, and said first sensor element is operable to measure deformation of said first body when said first body is deformed by the deformation of said second body, and
   wherein said first body is formed with a first space, and said second body is formed with a second space.

2. The multistage sensing device as claimed in claim 1, wherein said sensor unit includes a first electrode, a second electrode, and a third electrode that are disposed in said deformable unit, said second electrode and an upper portion of said first electrode cooperatively define said second sensor element, and said third electrode and a lower portion of said first electrode cooperatively define said first sensor element.

3. The multistage sensing device as claimed in claim 2, wherein said first body and said second body of said deformable unit are each made of a dielectric material.

4. The multistage sensing device as claimed in claim 2, wherein said first, second and third electrodes are each made of metal.

5. The multistage sensing device as claimed in claim 1, wherein:
   said first body has a first bottom portion formed on said substrate, a first side portion extending from a periphery of said first bottom portion away from said substrate, and a first top portion connected to said first bottom portion;
   said first bottom portion, said first side portion and said first top portion cooperatively define said first space;
   said second body has a second bottom portion formed on said first top portion, a second side portion extending from a periphery of said second bottom portion away from said substrate, and a second top portion connected to said second side portion and opposite to said second bottom portion; and said second bottom portion, said second side portion and said second top portion cooperatively define said second space.

6. The multistage sensing device as claimed in claim 5, wherein a first electrode is disposed between said first top portion of said first body and said second bottom portion of said second body, a second electrode is disposed in said second top portion of said second body, and a third electrode is disposed in said first bottom portion of said first body.

7. The multistage sensing device as claimed in claim 6, wherein an entirety of said third electrode is disposed below an entirety of said first space, and is disposed above an entirety of said substrate.

8. The multistage sensing device as claimed in claim 1, further comprising a filling member received in at least one of said first space or said second space for changing stiffness of at least one of said first body or said second body, and said filling member is made of polydimethylsiloxane.

9. The multistage sensing device as claimed in claim 1, further comprising a filling member received in at least one of said first space or said second space, and having a stiffness tunable by an external electric field or an external magnetic field.

10. The multistage sensing device as claimed in claim 9, wherein said filling member includes an insulating fluid and a plurality of particles dispersed in said insulating fluid.

11. The multistage sensing device as claimed in claim 10, wherein said particles of said filling member are dielectric particles that are capable of aligning along the external electric field for increasing said stiffness of said filling member.

12. The multistage sensing device as claimed in claim 10, wherein said particles of said filling member are magnetic particles that are capable of aligning along the external magnetic field for increasing said stiffness of said filling member.

13. The multistage sensing device as claimed in claim 9, wherein said deformable unit further has at least one through hole penetrating though said second top portion of said second body and being in spatial communication with said second space, such that said filling member is capable of entering said second space through said at least one through hole.

14. The multistage sensing device as claimed in claim 13, wherein said deformable unit includes a covering layer disposed on said second top portion of said second body and covering said at least one through hole.

15. The multistage sensing device as claimed in claim 14, wherein said covering layer is made of a material selected from the group consisting of parylene C, Parylene D, Parylene N, silicon dioxide, silicon nitride, polyimide, metal, and combinations thereof.

16. The multistage sensing device as claimed in claim 13, wherein said second top portion of said second body is formed with a recess in which said second electrode is disposed.

17. The multistage sensing device as claimed in claim 16, wherein said deformable unit includes a covering layer that is disposed on said second top portion of said second body, that covers said at least one through hole, and that contacts and covers said second electrode.

18. The multistage sensing device as claimed in claim 17, wherein said covering layer is made of a material selected from the group consisting of parylene C, Parylene D, Parylene N, silicon dioxide, silicon nitride, polyimide, metal, and combinations thereof.

19. The multistage sensing device as claimed in claim 1, wherein said first and second sensor elements are each a piezoresistive member.

20. The multistage sensing device as claimed in claim 1, wherein an entirety of said first sensor element is disposed below an entirety of said second sensor element and is disposed above an entirety of said substrate.

* * * * *